Dec. 15, 1931.  E. R. HELLMAN  1,836,027
PISTON RING
Filed July 11, 1930

INVENTOR.
ERNEST R. HELLMAN.
BY
ATTORNEY.

Patented Dec. 15, 1931

1,836,027

UNITED STATES PATENT OFFICE

ERNEST R. HELLMAN, OF DETROIT, MICHIGAN

PISTON RING

Application filed July 11, 1930. Serial No. 467,275.

This invention relates to piston rings and more particularly piston rings having substantially radial oil passages.

An object of the invention is to provide a piston ring having an improved provision for preventing oil leakage past the ring and facilitating a radial flow through the ring of such surplus oil as it encounters, so that such oil may be returned to the crankcase through the usual passages opening through the piston wall from the ring grooves.

Another object is to provide an improved connection between a piston ring and a spring expander for said ring.

A further object is to provide an improved method of manufacturing piston rings.

These and various other objects the invention attains by the construction hereinafter described, and illustrated in the accompanying drawings.

Figure 3:
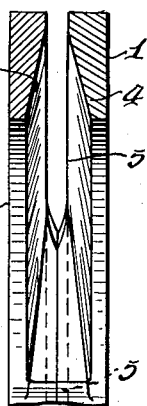
Fig. 3 is a cross-sectional view of the improved ring, taken upon the line 3—3 of Fig. 2.
Figure 4:
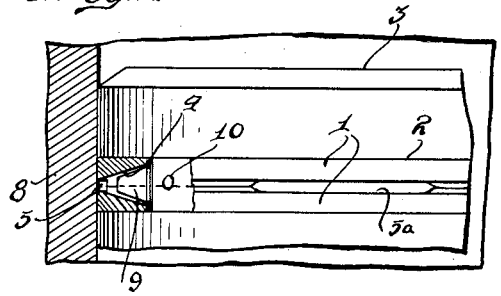
Fig. 4 is a fragmentary, elevational view of a piston, sectionally showing the improved ring engaged in a groove of said piston, and sectionally showing the associated cylinder wall.
Figure 5:
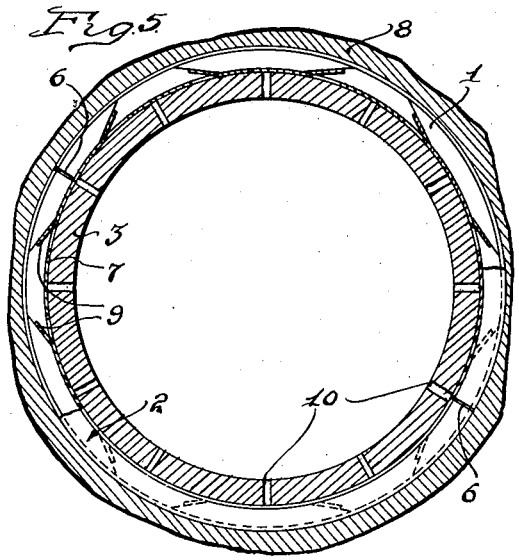
Fig. 5 is a cross-sectional view of the same, taken in part upon the line 5—5 of Fig. 4.
Figure 6:
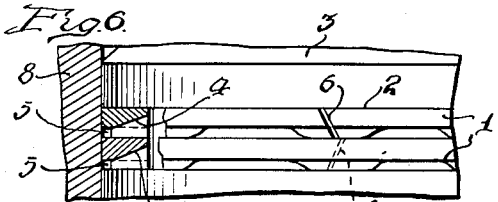
Fig. 6 is a view similar to Fig. 4, but showing an alternative ring construction.
Figure 7:
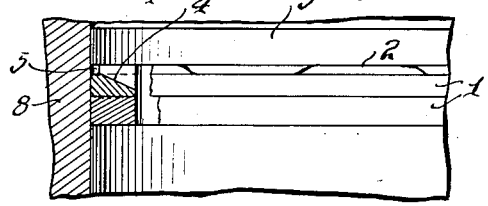
Fig. 7 is another view similar to Fig. 4, and showing a further modification of the improved ring.

In these views, the reference character 1 designates a pair of annular, duplicate parts which jointly form the improved ring, said parts in use lying side by side in the usual groove 2 of a piston 3. One side face of each of said parts is formed with circumferentially elongated bevels 4 at regular intervals forming angles preferably approximating twenty-five degrees with said side faces. In the assembled relation of the parts 1, the bevels 4 are so opposed on said parts as to converge toward the outer face of the ring, tending to meet closely adjacent to said face, as best appears in Fig. 3. In the outer face of the ring there is cut an annular groove 5, jointly formed in the parts 1, and having its depth suitable to take care of surplus oil. This groove, as Fig. 3 best shows, intersects the recesses 5a opening from the inner face of the ring and jointly formed by the bevels 4. Each part 1 is split, as indicated at 6, to permit a compression of the ring, the split ends of the two parts being at opposite sides of the ring when the latter is assembled, as Fig. 5 makes clear.

A split expander ring 7, preferably of spring steel, is set into the groove 2 and so compressed between the bottom of said groove and the inner faces of the parts 1 as to act expansively on said parts, tending to maintain sealing engagement thereof with the cylinder wall 8. Tapered tongues 9 are struck out of the ring 7 at such intervals and such inclinations to the outer face of said ring as adapt them to fit snugly into the ends of the recesses formed by the convergent bevels. (See Fig. 5).

In use of the described ring, the same is expanded into firm sealing contact with the associated cylinder wall partly by resilience of its parts 1 and partly by the expander ring 7.

As the piston reciprocates, any surplus oil finding its way between the ring and cylinder wall is trapped in the groove 5 and delivered through the passages 5a and openings 10 in the piston wall, leading from the groove 2 to the piston interior, whence it may drip back to the crank-case. The inwardly flaring form of the passages 5a offers a minimum of resistance to oil flowing from the outer face of the ring for a given area of opening in said face, and further has been found much less susceptible to clogging by carbon deposits than passages of constant cross-section or flaring toward the outer face of the ring.

Figure 1:
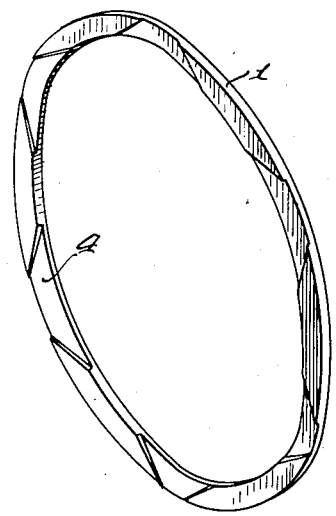
Fig. 1 is a perspective view of one of a pair of duplicate members, forming the improved ring.
Figure 2:
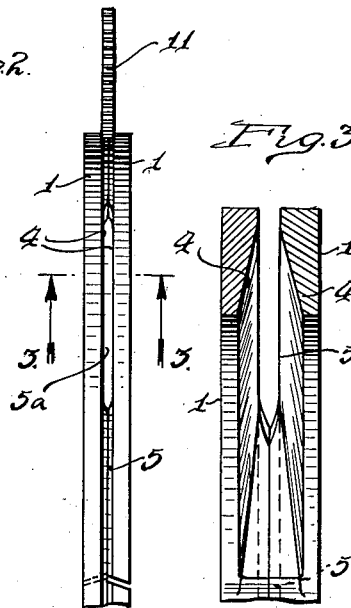
Fig. 2 is a view illustrating a means for forming the two parts of the improved ring with a shallow groove in the cylinder-engaging face of the ring to trap oil.

In the preferred method of forming the described ring, there is initially formed a pair of annular castings 1, each having cored in a side face thereof a series of bevels 4, as best appears in Fig. 1. The outer faces of said castings and their side faces, exclusive of the bevels 4, are next ground smooth, and a small segment is then sawed or otherwise cut from the ring, so as to permit the resulting beveled end faces 6 to be brought into close proximity on contraction of the ring to its working diameter. The members 1 are then firmly held, through any suitable means, in the contact illustrated in Fig. 2, their beveled faces being adjacent, and by a circular saw 11 or other suitable tool, the shallow groove 5 is jointly formed in their outer faces, its depth being such as to intersect the oil passages 5a. The ring is now ready for assembly, the assembling operation consisting in establishing the two rings side by side with their beveled faces registered circumferentially, and in inserting the spring expander 7 within both members with its tongues 9 projecting into passages 5a, as clearly appears in Fig. 5.

The spring expander ring 7 may in many cases be eliminated, the resilience of the members 1, alone serving to maintain the requisite sealing pressure.

While it is apparent that the illustrated embodiment of my invention is well calculated to adequately fulfill the objects and advantages primarily stated, it is to be understood that the invention is susceptible to variation, modification and change within the spirit and scope of the subjoined claims.

What I claim is:

1. The combination with a piston ring having a plurality of oil passages between its inner and outer faces, said passages being flared toward the inner face of said ring, of a split annular expander ring engaging the inner face of said piston ring and formed with a plurality of struck out tongues engaging in said flared passages.

2. A piston ring comprising a pair of split annular members jointly formed with a plurality of circumferentially spaced, substantially radial oil passages, and a split expander ring interiorly jointly engaging said members and formed with a plurality of struck out tongues engaging in said passages and maintaining a substantially fixed rotative relation of said members to each other.

3. A piston ring having a side face thereof formed with a plurality of circumferentially spaced bearing portions, and formed between said portions with a plurality of oil passages extending from the outer to the inner periphery of said ring, said passages flaring circumferentially of the ring as they extend inwardly and the side face of the ring, between said bearing portions being beveled to progressively reduce the thickness of the ring from substantially the intersection of said passages with the outer periphery of the ring to their intersections with its inner periphery.

4. A piston ring formed with a plurality of oil passages extending between its inner and outer circular faces, each of said passages being circumferentially elongated, the circumferentially spaced end walls of each of said passages diverging from said outer to said inner ring faces, and the side walls of each of said passages likewise diverging from said outer to said inner faces.

In testimony whereof I sign this specification.

ERNEST R. HELLMAN.